US012013782B2

(12) United States Patent
Guan et al.

(10) Patent No.: US 12,013,782 B2
(45) Date of Patent: Jun. 18, 2024

(54) PROCESSOR WITH PROTECTION OF AN ISOLATED MEMORY AND PROTECTION METHOD FOR THE ISOLATED MEMORY ACCESSIBLE ONLY BY A TRUSTED CORE

(71) Applicant: Shanghai Zhaoxin Semiconductor Co., Ltd., Shanghai (CN)

(72) Inventors: Yingbing Guan, Shanghai (CN); Junjie Zhang, Beijing (CN); Fangong Gong, Beijing (CN); Yanting Li, Beijing (CN); Yipu Liu, Shanghai (CN)

(73) Assignee: SHANGHAI ZHAOXIN SEMICONDUCTOR CO., LTD., Shanghai (CN)

(*) Notice: Subject to any disclaimer, the term of this patent is extended or adjusted under 35 U.S.C. 154(b) by 41 days.

(21) Appl. No.: 18/048,535

(22) Filed: Oct. 21, 2022

(65) Prior Publication Data

US 2024/0037035 A1 Feb. 1, 2024

(30) Foreign Application Priority Data

Jul. 29, 2022 (CN) .......................... 202210911855.4

(51) Int. Cl.
*G06F 12/0811* (2016.01)
*G06F 9/30* (2018.01)
*G06F 12/0862* (2016.01)

(52) U.S. Cl.
CPC ...... *G06F 12/0811* (2013.01); *G06F 9/30098* (2013.01); *G06F 12/0862* (2013.01)

(58) Field of Classification Search
None
See application file for complete search history.

(56) References Cited

FOREIGN PATENT DOCUMENTS

| CN | 111221775 A | * | 6/2020 | ......... G06F 15/7846 |
| CN | 115905099 A | * | 4/2023 | |

* cited by examiner

*Primary Examiner* — Brian R Peugh
(74) *Attorney, Agent, or Firm* — McClure, Qualey & Rodack, LLP (57) ABSTRACT

A processor with protection of an isolated memory and protection method for the isolated memory accessible only by a trusted core are shown. A processor has a trusted core with a right to access an isolated memory planned on a system memory, a normal core prohibited from accessing the isolated memory, and a last-level cache shared by the trusted core and the normal core. The in-core cache structure of the normal core and the last-level cache are included in a hierarchical cache system. In response to a memory access request issued by the normal core, the hierarchical cache system determines whether the memory access request hits the isolated memory and, if yes, the hierarchical cache system rejects the memory access request.

24 Claims, 10 Drawing Sheets

PROCESSOR WITH PROTECTION OF AN ISOLATED MEMORY AND PROTECTION METHOD FOR THE ISOLATED MEMORY ACCESSIBLE ONLY BY A TRUSTED CORE

CROSS REFERENCE TO RELATED APPLICATIONS

This application claims priority of China Patent Application No. 202210911855.4, filed on Jul. 29, 2022, the entirety of which is incorporated by reference herein.

BACKGROUND

Technical Field

The present application relates to trusted computing, and, in particular, to access control of an isolated memory that is exclusively planned for the trusted computing.

Description of the Related Art

The term trusted computing (TC) refers to technologies that use hardware-based roots of trust to improve computer security, such as by dividing the hardware into partitions. For example, a partition of a system memory of a computer system may be used as an isolated memory, and only the trusted core is permitted to access the isolated memory.

Access control to the isolated memory is an important issue in trusted computing.

BRIEF SUMMARY

A processor in accordance with an exemplary embodiment of the present application has a trusted core, a normal core, and a last-level cache. The trusted core has the right to access an isolated memory located on a system memory. The normal core is prohibited from accessing the isolated memory. The last-level cache is shared by the trusted core and the normal core. The in-core cache structure of the normal core and the last-level cache are included in a hierarchical cache system. In response to a memory access request issued by the normal core, the hierarchical cache system determines whether the memory access request hits the isolated memory and, if yes, the hierarchical cache system rejects the memory access request.

A method for protection of an isolated memory owned by a trusted core of a processor is also shown. The method includes the following steps: allocating a processor to provide a trusted core which has the right to access an isolated memory located on a system memory, and prohibiting the normal core of the processor from accessing the isolated memory; in response to a memory access request issued by the normal core, operating a hierarchical cache system of the processor to determine whether the memory access request hits the isolated memory, wherein the hierarchical cache system includes the in-core cache structure of the normal core and a last-level cache shared by the normal core and the trusted core; and when the memory access request hits the isolated memory, the hierarchical cache system rejects the memory access request.

A detailed description is given in the following embodiments with reference to the accompanying drawings.

BRIEF DESCRIPTION OF THE DRAWINGS

The present application may be more fully understood by reading the subsequent detailed description and examples with references made to the accompanying drawings, wherein.

DETAILED DESCRIPTION

The following description is made for the purpose of illustrating the general principles of the application and should not be taken in a limiting sense. The scope of the application is best determined by reference to the appended claims.

Figure 1:
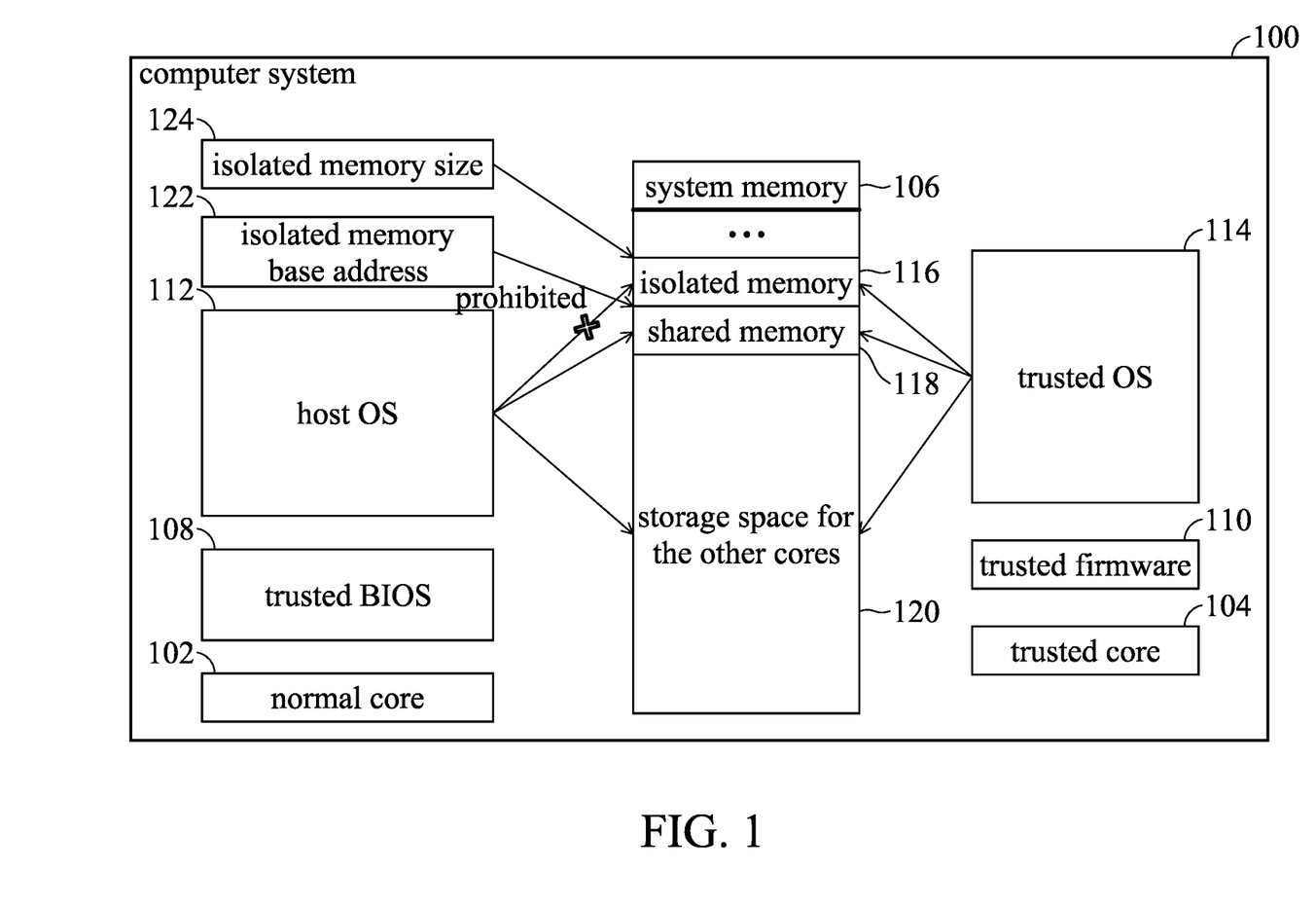
FIG. 1 illustrates the concept of an isolated memory.

FIG. 1 illustrates the concept of an isolated memory. A computer system 100 with trusted computing capability includes a normal core 102, a trusted core 104, and a system memory (such as a dynamic random access memory DRAM, etc.) 106. For the trusted computing, the computer system 100 further provides a trusted basic input and output system (trusted BIOS) 108 and trusted firmware 110. The normal core 102 executes a host operating system (host OS) 112. The trusted core 104 executes a trusted operating system (trusted OS) 114. The system memory 106 is divided into partitions, including an isolated memory 116, a shared memory 118, and a storage space 120 for the other cores. As shown, the isolated data in the isolated memory 116 is protected to be only accessed through the trusted OS 114, and in particular, is prohibited from being accessed through the host OS 112. In the present application, the space of the isolated memory 116 is marked in registers (e.g., model-specific registers MSR). By checking the MSR, the processor identifies and rejects the illegal access to the isolated data. As shown in the figure, the computer system 100 stores the isolated memory base address 122 and the isolated memory size 124 in the registers, so that the normal core 102 may identify and reject the illegal access to the isolated memory during a cache matching stage. The processor of the present application may further issue an interrupt report for the illegal access during the cache matching stage.

In addition to the single normal core (102) case, some processors may have multiple cores. A processor architecture with a single normal core 102 is first described below.

Figure 2:
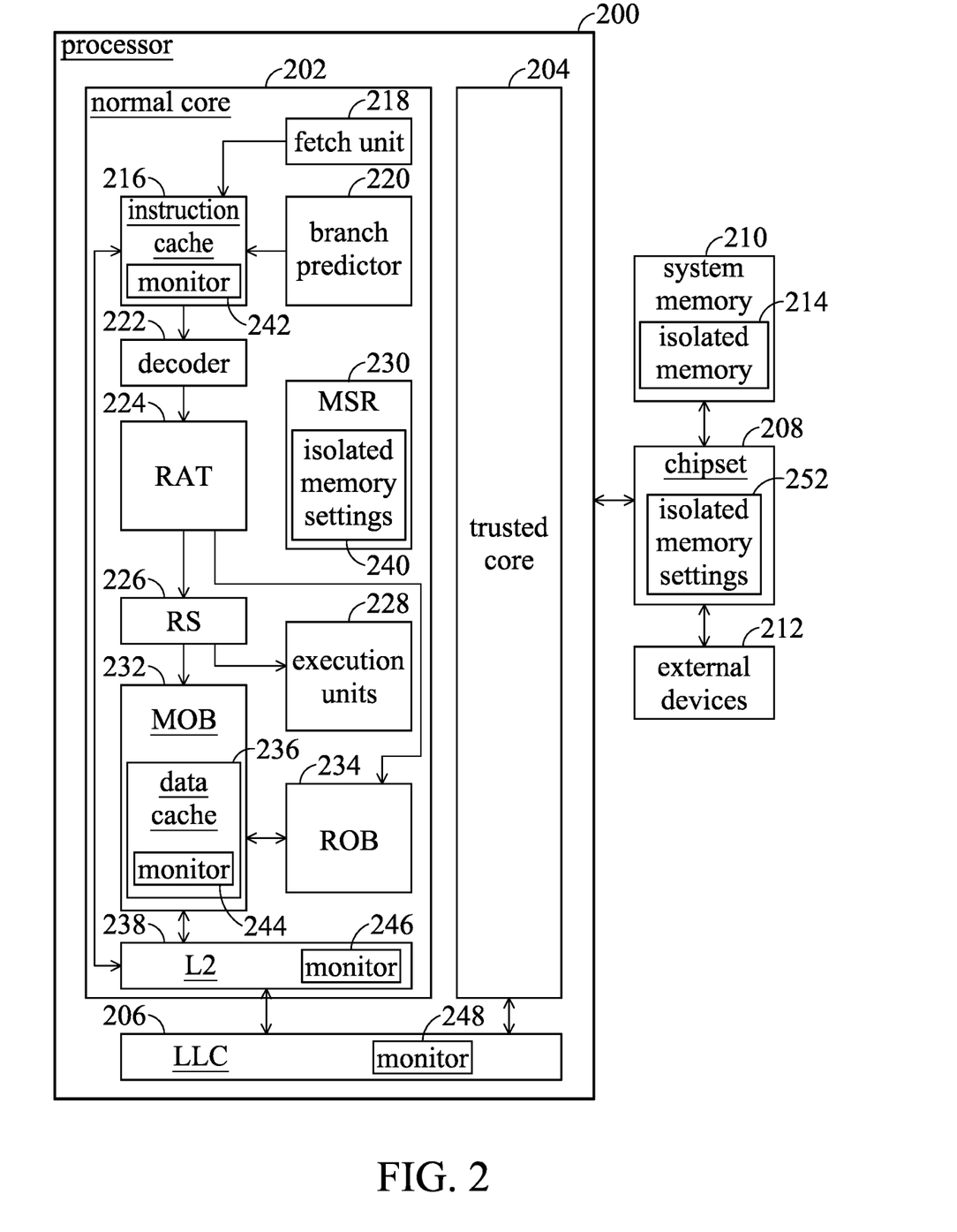
FIG. 2 illustrates a processor 200 in accordance with an exemplary embodiment of the present application, which has a single normal core 202 and a trusted core 204.

FIG. 2 illustrates a processor 200 in accordance with an exemplary embodiment of the present application, which has a single normal core 202 and a trusted core 204. In an exemplary embodiment, the trusted core 204 and the normal core 202 have the same structure (i.e., isomorphic cores). The processor 200 adopts a hierarchical cache architecture. A last-level cache (LLC for short) 206 is shared by the normal core 202 and the trusted core 204. The processor 200 is coupled to a chipset 208 for communication with a system memory 210 and one or more external devices 212. Similar to the system memory 106 shown in FIG. 1, the system memory 210 is divided into several partitions. The isolated content stored in the isolated memory 214 is only allowed to be accessed by the trusted core 204, and is not permitted to be accessed by the normal core 202. The external device 212 may be a hard disk (a solid state disk or a mechanical hard disk), a keyboard, a mouse, a monitor, a network card, and the like. A special design for the normal core 202 is introduced as follows.

The instruction cache 216 operates in response to fetch unit 218 and a branch predictor 220. The instruction cache 216 caches instructions read from the system memory 210. The instructions cached in the instruction cache 216 are decoded by a decoder 222 to be transformed into micro-instructions and then, through a register alias table (RAT) 224 and a reservation station (RS) 226, sent to the execution units 228 for execution. The execution may involve various memory accesses. The memory order buffer (MOB) 232 is provided for the normal core 202 to communicate with the various memories. A re-order buffer (ROB) 234 is connected to the RAT 224. The MOB 232 operates according to the ROB 234 and the RS 226. The MOB 232 has a data cache 236. The data cache 236 and the instruction cache 216 may be collectively referred to as a first-level cache L1. The first-level cache L1 may be combined with a second-level cache (L2) 238 and the last-level cache (LLC) 206 to form a hierarchical cache system. The instructions or data read from the system memory 210 may be cached in such a hierarchical cache system to accelerate the processor 200. However, isolated content read from the isolated memory 214 may be exposed by such a hierarchical cache system. The solution proposed in the present application may prohibit the normal core 202 from accessing the isolated content in a cache matching stage.

As shown in FIG. 2, the model specific registers (MSR) 230 may record isolated memory settings 240, including the isolated memory base address 122 and the isolated memory size 124 introduced in FIG. 1 which indicate the location of the isolated memory 214 provided on the system memory 210. The first-level cache (including the instruction cache 216 and the data cache 236), the second-level cache 238, and the last-level cache 206 each is equipped with a monitor (referring to a monitor 242 in the instruction cache 216, a monitor 244 in the data cache 236, a monitor 246 in the second-level cache 238, and a monitor 248 in the LLC 206). Based on the isolated memory settings 240 recorded in the MSR 230, the monitors 242, 244, 246, and 248 monitor whether the normal core 202 requests to access the isolated memory 214, to promptly prohibit the illegal access to the isolated memory 214 or even to trigger an interrupt. The isolated memory settings 240 recorded in the MSR 230 may further show whether to enable or disable the interrupt. The type adopted by the enabled interrupt may be also shown in the isolated memory settings 240.

In FIG. 2, the chipset 208 also has the isolated memory settings (252) loaded thereon. In another exemplary embodiment, the isolated memory settings 252 are recorded in an uncore area of the processor 200. During an initialization procedure, the processor 200 first fills in the isolated memory settings 252 to indicate the location of the isolated memory 214 in the system memory 210 and to set the details of the interrupt. Then, the model-specific registers (MSR) 230 are programmed to fill in the isolated memory settings 240 by referring to the isolated memory settings 252. The initialization procedure of the processor will be described in detail later based on the flows shown in FIG. 5 and FIG. 9.

Figure 3:
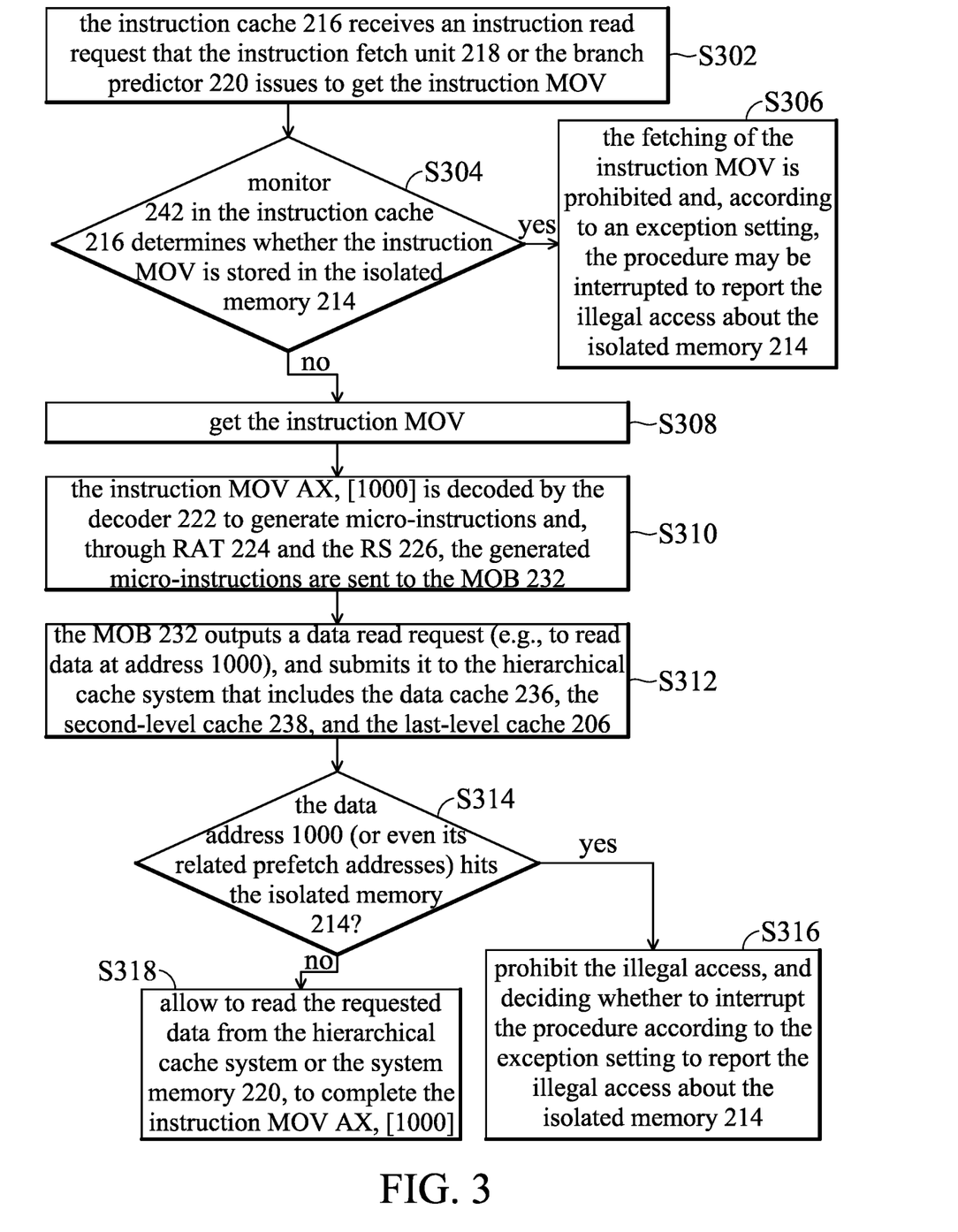
FIG. 3 is a flowchart illustrating how the normal core 202 executes an instruction: MOV AX, [1000]

FIG. 3 is a flowchart illustrating how the normal core 202 executes an instruction: MOV AX, [1000]. The instruction MOV AX, [1000] is stored in a system memory 210 as one of the instructions of a program/procedure being executed by the normal core 202.

In step S302, the instruction cache 216 receives an instruction read request that the instruction fetch unit 218 or the branch predictor 220 issues to get the instruction MOV. In some situations, the normal core 202 may need to execute the instruction MOV. For example, the instruction fetch unit 218 may generate the instruction read request according to an instruction pointer (IP for short) presented in an instruction pointer register (not shown in the figure) of the normal core 202. In another example, the branch predictor 220 may generate the instruction read request according to its prediction about a branch instruction. The instruction read request may indicate a system memory address where the system memory 210 stores the instruction MOV. The instruction fetch unit 218 (or the branch predictor 220) then sends the generated instruction read request to the instruction cache 216.

In step S304, the monitor 242 in the instruction cache 216 determines whether the instruction MOV is stored in the isolated memory 214 of the system memory 210. If so, the flow goes to step S306, the fetching of the instruction MOV is prohibited and, according to an exception setting, the procedure may be interrupted to report the illegal access about the isolated memory 214. If the requested instruction MOV is not stored in the isolated memory 214, the flow goes to step S308. The instruction MOV is read from the system memory 210. As for how the monitor 242 determines whether the instruction MOV is stored in the isolated memory 214 and how to report an interrupt when the instruction MOV is stored in the isolated memory 214, the details will be described later with reference to FIG. 4, FIG. 6A, and FIG. 7. The step S308 is described below.

In step S308, the instruction MOV is obtained by the normal core 202. If the instruction MOV has already been cached in the instruction cache 216, the instruction MOV is obtained from the instruction cache 216. If the instruction MOV has not been cached in the instruction cache 216, the instruction cache 216 may send the instruction read request to the second-level cache 238. If the instruction MOV has not been cached in the second-level cache 238, the second-level cache 238 may send the instruction read request to the last-level cache 206. If the instruction MOV has not been cached in the last-level cache 206, the instruction MOV is read from the system memory 210, and cached by the last-level cache 206, the second-level cache 238 and the instruction cache 216 in sequence. In the process of reading the instruction MOV, the instruction cache 216, the second-level cache 238, and the last-level cache 206 may generate a plurality of prefetch addresses. The monitors 242, 246, and 248 may determine whether the prefetch addresses hit the isolated memory 214. If a prefetch address does not hit the isolated memory 214, the content stored at the prefetch address in the system memory 210 is prefetched and cached by the instruction cache 216, the second-level cache 238, and the last-level cache 206 to improve the processing efficiency of the processor 200. The processing procedures of the instruction cache 216, the second-level cache 238, and the last-level cache 206 will be described in detail later with reference to FIGS. 6A, 6B and 7. Step S310 is described below.

In step S310, the instruction MOV AX, is decoded by the decoder 222 to generate micro-instructions. Through the register alias table (RAT) 224 and the reservation station (RS) 226, the generated micro-instructions are sent to the memory order buffer (MOB) 232. Accordingly, in step S312, the memory order buffer (MOB) 232 outputs a data read request (e.g., to read data at address 1000), and submits it to the hierarchical cache system that includes the data cache 236, the second-level cache 238, and the last-level cache 206. In step S314, the monitors 244, 246, and 248 in the hierarchical cache system determine whether the data address 1000 (or even its related prefetch addresses) hits the isolated memory 214 of the system memory 210. If so, the flow goes to step S316, prohibiting the illegal access, and deciding whether to interrupt the procedure according to the exception setting to report the illegal access about the isolated memory 214. If not, the flow proceeds to step S318, it is allowed to read the requested data from the hierarchical cache system or the system memory 220, to complete the instruction MOV AX, [1000]. The operations of the data cache 236, the second-level cache 238 and the last-level cache 206 will be described in detail below with reference to FIGS. 6A, 6B and 7.

As presented in the flow of FIG. 3, in the execution of the instruction MOV, the normal core 202 first searches the hierarchical cache system (including the instruction cache 216, the second-level cache 238, and the last-level cache 206) according to an instruction read request to get the instruction MOV AX, [1000], and then searches the hierarchical cache system (including the data cache 236, the second-level cache 238, and the last-level cache 206) according to a data read request to get the operand of the instruction MOV (to get the data at address 1000). Especially, in the hierarchical cache system, the instruction read request or data read request has to be checked based on the isolated memory settings 240 to determine whether the requested instruction or data hit the isolated memory 214. If yes, the instruction or data read request is prohibited and an interruption report is submitted.

In an exemplary embodiment, the trusted core 204 and the normal core 202 have the same structure (i.e., the trusted core 204 and the normal core 202 are isomorphic in structure). The trusted core 204 is allowed to access the whole system memory 210 including the isolated memory 214. In an exemplary embodiment, each request issued by the trusted core 204 and received by the last-level cache 206 carries one symbol. Once the last-level cache 206 recognizes the symbol, it knows that the request is issued by the trusted core 204, and the monitor 248 does not need to monitor whether the received request hit the isolated memory 214.

Figure 4:
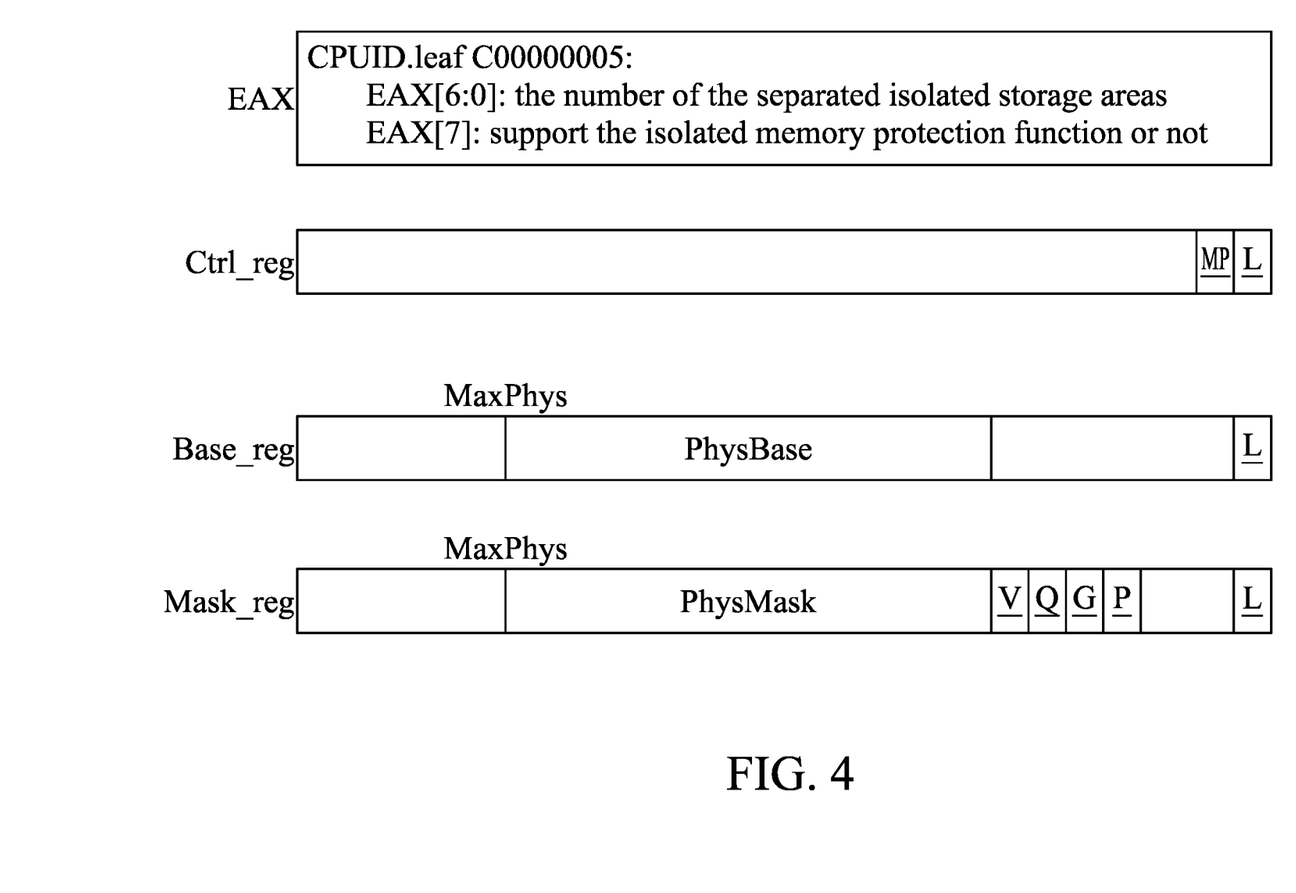
FIG. 4 illustrates the registers recording the isolated memory settings 240 in accordance with an exemplary embodiment of the present application.

FIG. 4 illustrates the registers recording the isolated memory settings 240 in accordance with an exemplary embodiment of the present application.

In an exemplary embodiment, an instruction CPUID is designed to get the settings about the isolated memory 214, and record the settings in a register EAX. One bit (e.g., bit [7]) of the register EAX may show whether the processor 200 supports the isolated memory protection function. In some exemplary embodiments, the isolated memory 214 may be formed by divided sections of the system memory 214. The number of the separated isolated storage areas may be presented in the register EAX (e.g., recorded by bits[6:0] of EAX).

As shown in FIG. 4, one register of the model-specific registers (MSR) 230 is used as a control register Ctrl_reg, in which one bit (e.g. bit [1]) is an enable bit MP for enabling the isolated memory protection function.

For each isolated storage area, the model-specific registers (MSR) 230 are planned to provide a pair of registers: one register is used as a base address register Base_reg to store the base address PhysBase (referring to 122 of FIG. 1) of the corresponding isolated storage area, and another register is used as a size register Mask_reg to store the size PhysMask (referring to 124 of FIG. 1) of the corresponding isolated storage area.

In order to prevent hackers from arbitrarily modifying the contents of the registers, the control register Ctrl_reg, the base address register Base_reg, and the size register Mask_reg all use a bit (such as bit [0]) as an lock indicator L. Once the control register Ctrl_reg, the base address register Base_reg, and the size register Mask_reg are edited, the lock indicator L changes from 0 to 1 (asserted), and the control register Ctrl_reg, the base address register Base_reg, and the size register Mask_reg are not allowed to be changed again. The size register Mask_reg may further use one bit as a valid indicator V, showing the pair of registers Base_reg and Mask_reg is valid or invalid. When the valid indicator V is asserted, it means that the indicated isolated storage area is indeed a part of the isolated memory 214.

The size register Mask_reg further shows the adopted interrupt design by three bits Q, G, and P. If the bit Q is 1, the illegal access to the isolated memory 214 is not reported, and the instructions after the prohibited illegal access is subsequently executed without being postponed by an interrupt. If the bit Q is 0 and the bit G is 1, the illegal access to the isolated memory 214 is reported by one conventional interrupt #GP (a general-protection exception). If both of the bits Q and G are 0 but the bit P is 1, illegal access to the isolated memory 214 is reported by a newly-defined interrupt. Taking an x86 processor as an example, defining a new interrupt requires defining a new interrupt vector and the corresponding interrupt handler. For example, in the 13H-1FH (reserved) or 20H-FFH (free use) sections of the interrupt vector table, a vector number may be selected as the new interrupt vector number, and a new interrupt handler may be designed for it.

Figure 5:
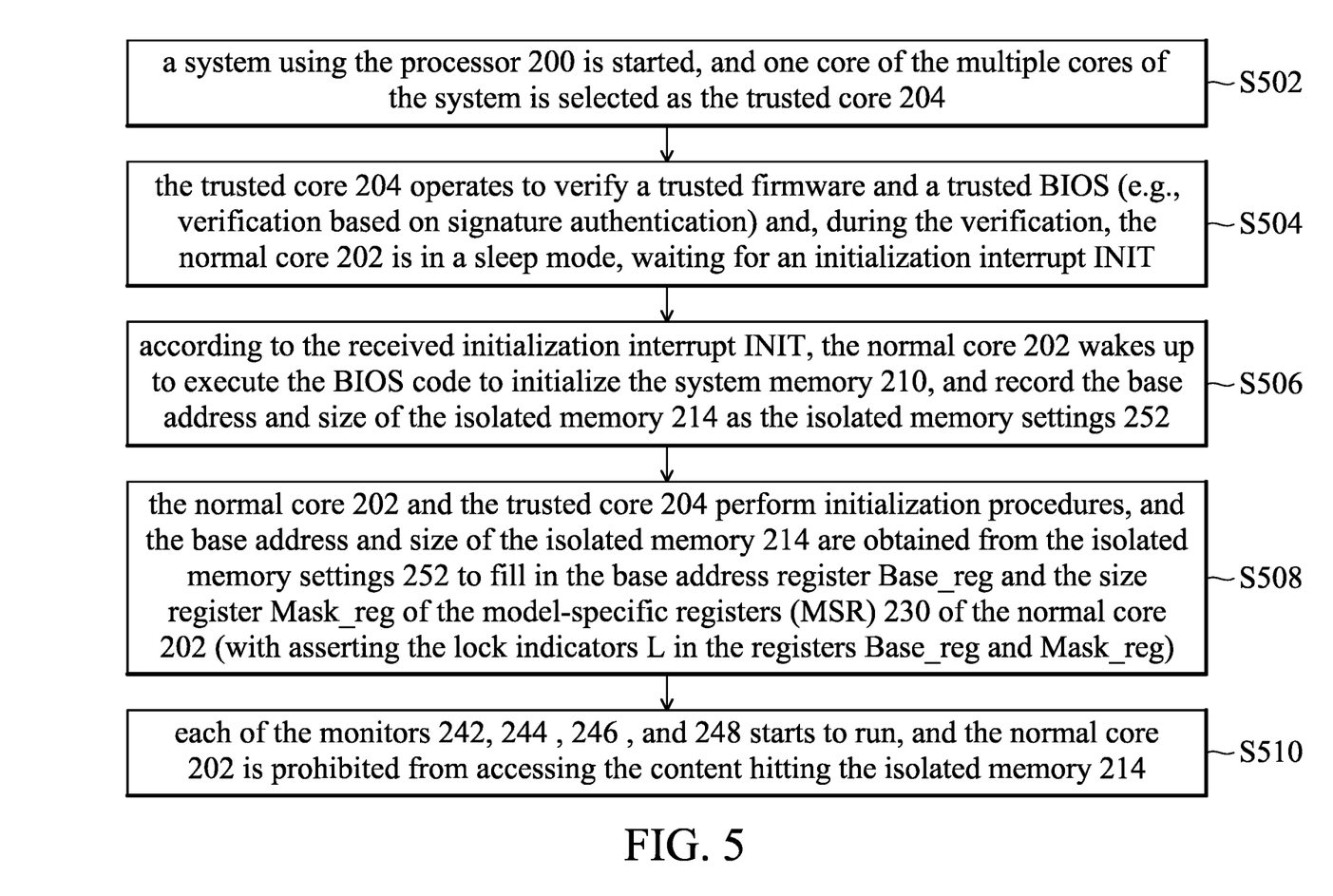
FIG. 5 is a flowchart illustrating a startup procedure of the processor 200 in accordance with an exemplary embodiment of the present application.

FIG. 5 is a flowchart illustrating a startup procedure of the processor 200 in accordance with an exemplary embodiment of the present application.

Referring to FIG. 2 and FIG. 5, in step S502, the system using the processor 200 is started, and one core of the multiple cores of the system is selected as the trusted core 204. In step S504, the trusted core 204 operates to verify a trusted firmware and a trusted basic input and output system (e.g., verification based on signature authentication). During the verification, the normal core 202 is in a sleep mode, waiting for an initialization interrupt INIT. After completing the verification, the trusted core 204 sends an initialization interrupt INIT to the normal core 202, and enters its sleep mode (hlt sleep). In step S506, according to the received initialization interrupt INIT, the normal core 202 wakes up to execute the basic input and output system (BIOS) code to initialize the system memory 210, and record the base address and size of the isolated memory 214 as the isolated memory settings 252. In step S508, the normal core 202 and the trusted core 204 perform initialization procedures, and the base address and size of the isolated memory 214 are obtained from the isolated memory settings 252 to fill in the base address register Base_reg and the size register Mask_reg of the model-specific registers (MSR) 230 of the normal core 202 (with asserting the lock indicators L in the registers Base_reg and Mask_reg). In step S510, each of the monitors 242, 244, 246, and 248 starts to run, and the normal core 202 is prohibited from accessing the content hitting the isolated memory 214. The detailed steps may be found in FIG. 3, and will not be repeated here.

Figure 6A:
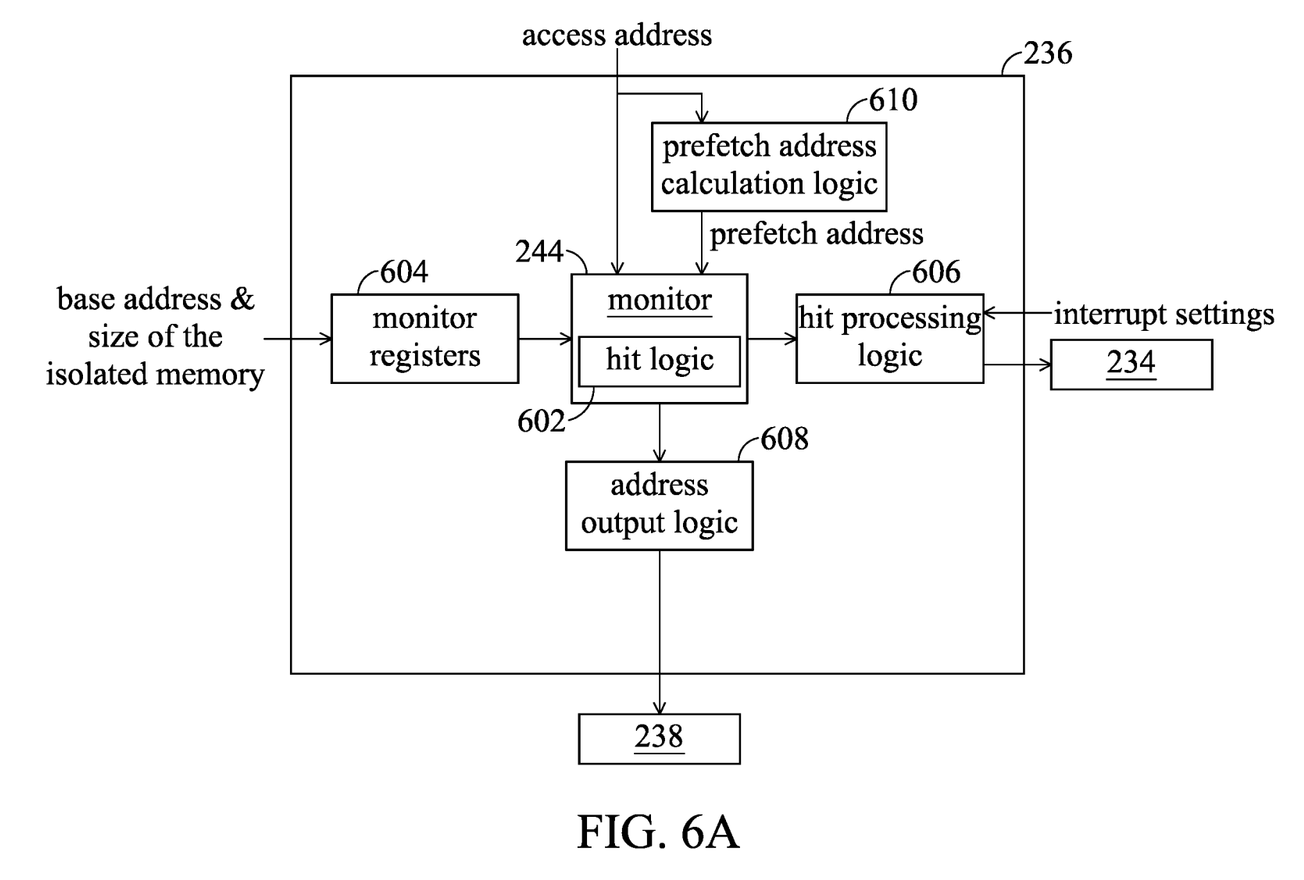
FIG. 6A is a block diagram illustrating the architecture of the data cache 236 (which is a kind of the first-level cache) in accordance with an exemplary embodiment of the present application.
Figure 6B:
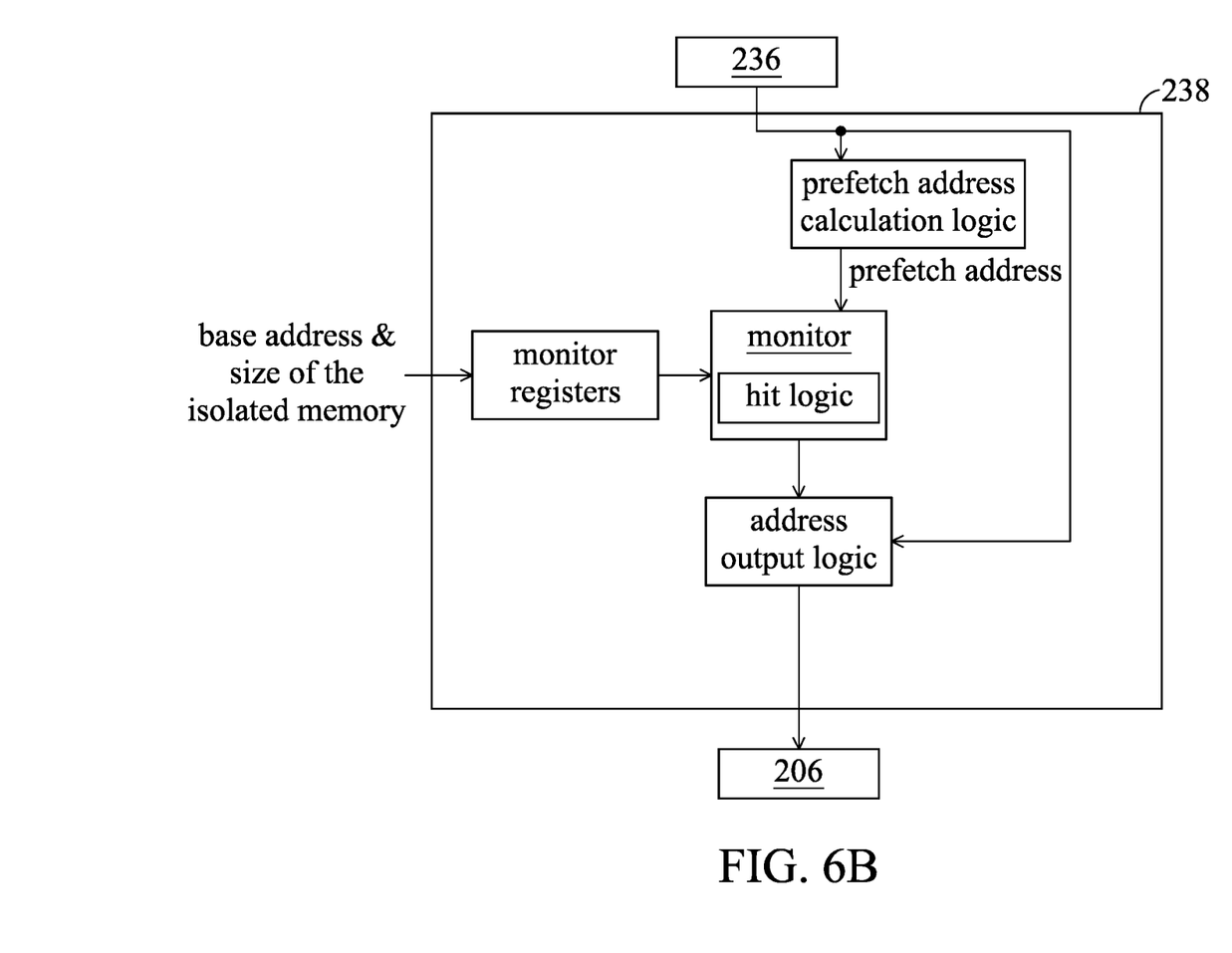
FIG. 6B is a block diagram illustrating the architecture of the second-level cache 238 of FIG. 2 in accordance with an exemplary embodiment of the present application.
Figure 7:
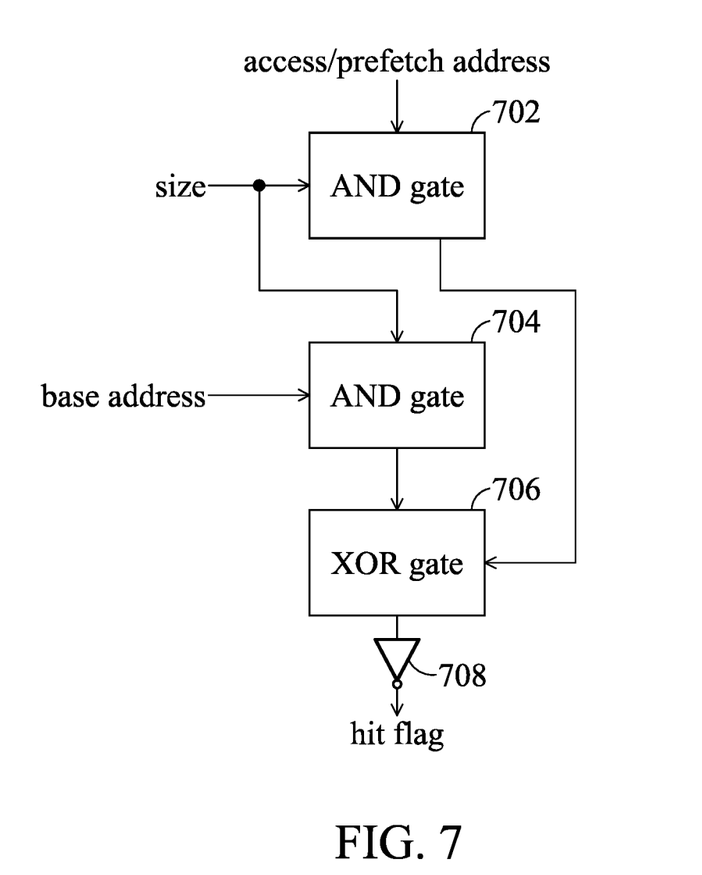
FIG. 7 depicts the details of the hit logic 602 in accordance with an exemplary embodiment of the present application.

FIGS. 6A, 6B, and 7 show how the first-level cache (including the instruction cache 216 and the data cache 236), the second-level cache 238, and the last-level cache 206 in FIG. 2 work to prohibit the illegal access to the isolated memory 214.

FIG. 6A is a block diagram illustrating the architecture of the data cache 236 (which is a kind of the first-level cache) in accordance with an exemplary embodiment of the present application. The similar design may be used in the instruction cache 216, which is another kind of the first-level cache. In the following discussions, the introduced logics may be implemented by hardware, or software, or a co-design of hardware and software.

The monitor 244 of the data cache 236 uses a hit logic 602. In addition to the monitor 244, the data cache 236 further includes monitor registers 604, a hit processing logic 606, an address output logic 608, and a prefetch address calculation logic 610. The monitor register 604 stores the base address and the size obtained from the isolated memory settings 240. The hit logic 602 takes the contents stored in the monitor register 604 as a reference to identify the illegal access requests. The hit processing logic 606 operates according to the interrupt settings obtained from the isolated memory settings 240 (referring to the Q, G, and P bits of the register Mask_reg shown in FIG. 4), to determine whether to report an interrupt when the isolated memory 214 is hit by an access request from the normal core 202. If the bit Q is 1, no report is submitted even if an illegal access to the isolated memory 214 occurs, and the instructions following the illegal access in the program under execution is continually executed. If the bit Q is 0 and the bit G is 1, the illegal access to the isolated memory 214 is reported through a conventional interrupt #GP (a general-protection exception). If the bits Q and G are both 0 and the bit P is 1, the illegal access to the isolated memory 214 is reported by using a newly-defined interrupt. The details of the interrupt settings in the size register Mask_reg have been described above.

Referring to FIG. 6A, in response to an access request, the access address (e.g., a data address in the system memory 210 that the normal core 202 issues to read) must be checked by the hit logic 602 of the monitor 244. If the access address hits the isolated memory 214, the monitor 244 asserts a hit flag, and kills the access request. When the hit flag is asserted, the hit processing logic 606 is activated. According to the interrupt settings (G, Q, and P), the hit processing logic 606 may report or not report an interrupt (a conventional interrupt or a newly defined interrupt) to the re-order buffer (ROB) 234. The re-order buffer (ROB) 234 may trigger a corresponding interrupt handler in response to the received conventional or newly-defined interrupt. While the monitor 244 determines whether the access address hits the isolated memory 214, the data cache 236 also checks whether the access target has already been cached in this cache (236). If the access address does not hit the isolated memory 214 and the access target has already been cached in the data cache 236, the cache content is returned to respond to the data access request; otherwise, the access address is sent to the second-level cache 238 by the address output logic 608.

In particular, the data cache 236 has a prefetch design. Based on the access address received by the data cache 236, a prefetch address is calculated by the prefetch address calculation logic 610. The prefetch address also needs to be checked by the hit logic 602 to prohibit any illegal access to the isolated memory 214. In an exemplary embodiment, the hit processing logic 606 may not be activated when the prefetch address hits the isolated memory 214. The interrupt report may only be generated when the isolated memory 214 is targeted by the in-core access request (not the access requests generated by the prefetch design). If the prefetch address does not hit the isolated memory 214, the prefetch address is sent to the second-level cache 238 through the address output logic 608.

FIG. 6B is a block diagram illustrating the architecture of the second-level cache 238 of FIG. 2 in accordance with an exemplary embodiment of the present application. A similar design may be used in the last-level cache 206.

In contrast to FIG. 6A, FIG. 6B does not include the hit processing logic 606. Since in-core issued access requests related to the isolated memory 214 have already been excluded by the first-level cache 236, the lower-level caches (the second-level cache 238 and the last-level cache 206) do not need to waste hardware on the same interrupt reporting. The lower-level caches only need to check the prefetch address calculated by the prefetch address calculation logic at the current level. If the prefetch address calculated at the current level hits the isolated memory 214, the contents at the prefetch address is bypassed without being loaded for cache. If the prefetch address calculated at the current level does not hit the isolated memory 214, the contents at the prefetch address is loaded for cache (for example, read from the system memory 210 and then loaded into the last-level cache 206 and the second-level cache 238). In particular, the hardware modules (e.g., the monitoring registers, the monitors, the hit logic, and the prefetch address calculation logic) for the different levels of caches may be slightly modified to fit the cache design of each level.

FIG. 7 depicts the details of the hit logic 602 in accordance with an exemplary embodiment of the present application, which include two AND gates 702 and 704, an exclusive-OR gate (XOR) 706, and an inverter 708. An access address (or a prefetch address) and the size of an isolated memory 214 are processed by the AND gate 702. The output of the AND gate 702 is used as one input to the XOR gate 706. The size of the isolated memory 214 and the base address indicating the isolated memory 214 are processed by the AND gate 704. The output of the AND gate 704 is used as another input to the XOR gate 706. The output of the XOR gate 706 is inverted by the inverter 708 to assert/deassert a hit flag. If the access/prefetch address hits the isolated memory 214, the XOR result is 0 and the hit flag is 1. Otherwise, the XOR result is 1, and the hit flag is 0.

In an exemplary embodiment, the base address of the isolated memory 214 is, for example, 000200H (whose 12 least significant bits are truncated), and the size of the isolated memory 214 is FFFE00. It means that the isolated memory 214 correspond to an address range from 200000H to 3FFFFFH. If the access address is 200010H, the following calculations are performed:

NOT ((200010H AND FFFE00000H) XOR (000200000H AND FFFE00000H))
=NOT (200000H XOR 200000H)
=NOT (0)
=1

The hit flag is 1, which shows that the access address 200010H hits the isolated memory 200000H-3FFFFFH. The above calculations include logical NOT, AND, and XOR calculations.

Figure 8:
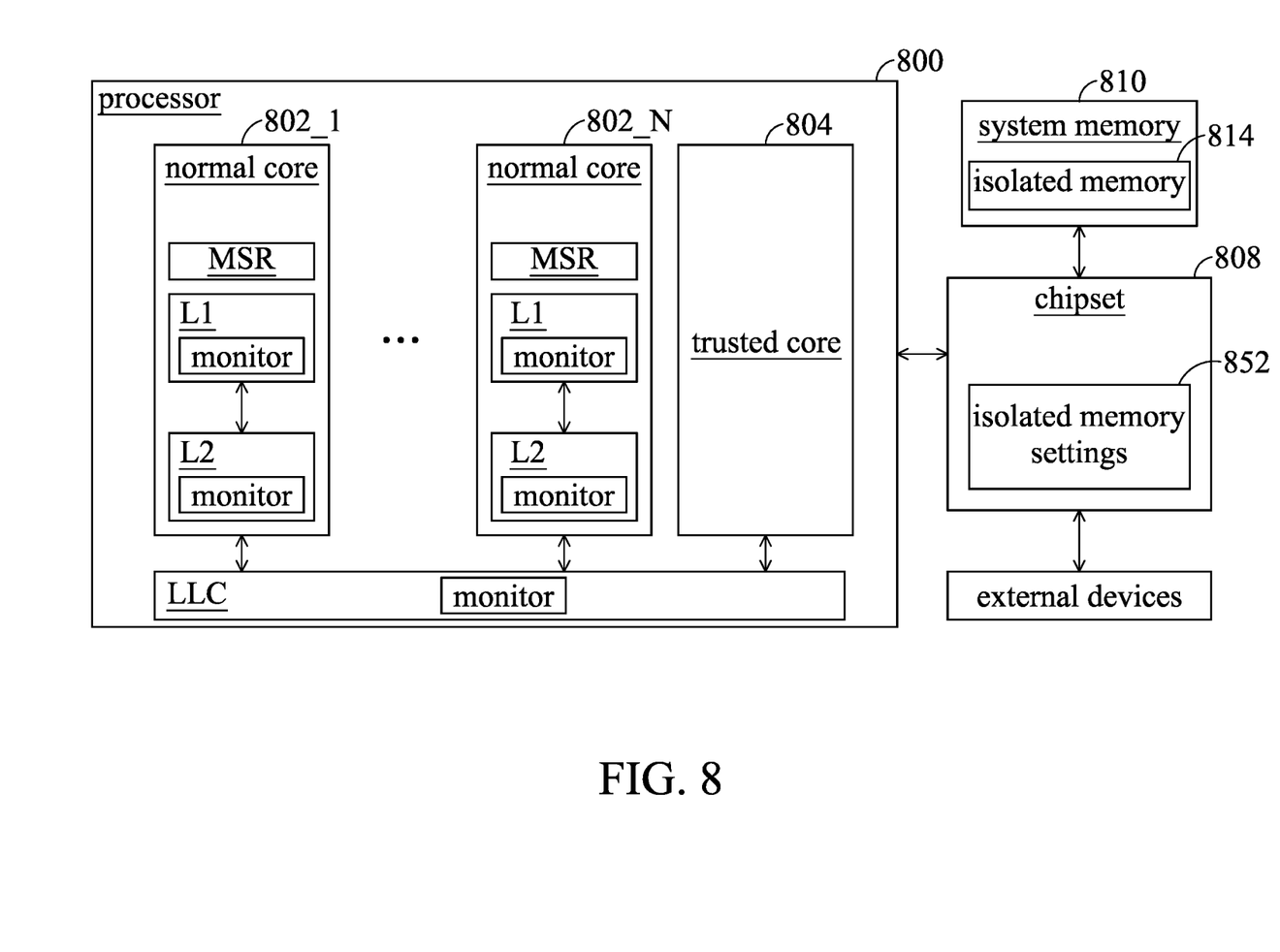
FIG. 8 shows a processor 800 in accordance with an exemplary embodiment of the present application, which includes a plurality of normal cores 802_1 ... 802_N and a trusted core 804.

FIG. 8 shows a processor 800 in accordance with an exemplary embodiment of the present application, which includes a plurality of normal cores 802_1 . . . 802_N and a trusted core 804. The architecture of the normal cores 802_1 . . . 802_N is isomorphic to the architecture of the normal core 202 of FIG. 2. The normal cores 802_1 . . . 802_N each have a set of model-specific registers (MSR) storing the isolated memory settings (including the base address and size of the isolated memory 814, and the interrupt mode for an illegal access request). The architecture of the chipset 808 may be similar to that of the chipset 208 shown in FIG. 2. In another exemplary embodiment, the isolated memory settings 852 are provided within the processor 800 in an uncore area of the processor 800. Referring to the first-level caches L1 (each L1 includes a data cache and an instruction cache) and the second-level caches L2 within the different cores, each cache has a monitor. Similarly, the last-level cache LLC shared by the different cores also has a monitor. FIG. 6A, and FIG. 6B show the details of the monitors. An illegal access request issued by any of the normal cores 802_1 . . . 802_N to access the isolated memory 814 will be prohibited by the monitors in the different levels of caches. In an exemplary embodiment, the trusted core 804 and the normal cores 802_1 . . . 802_N have the same structure (i.e., isomorphic cores).

Figure 9:
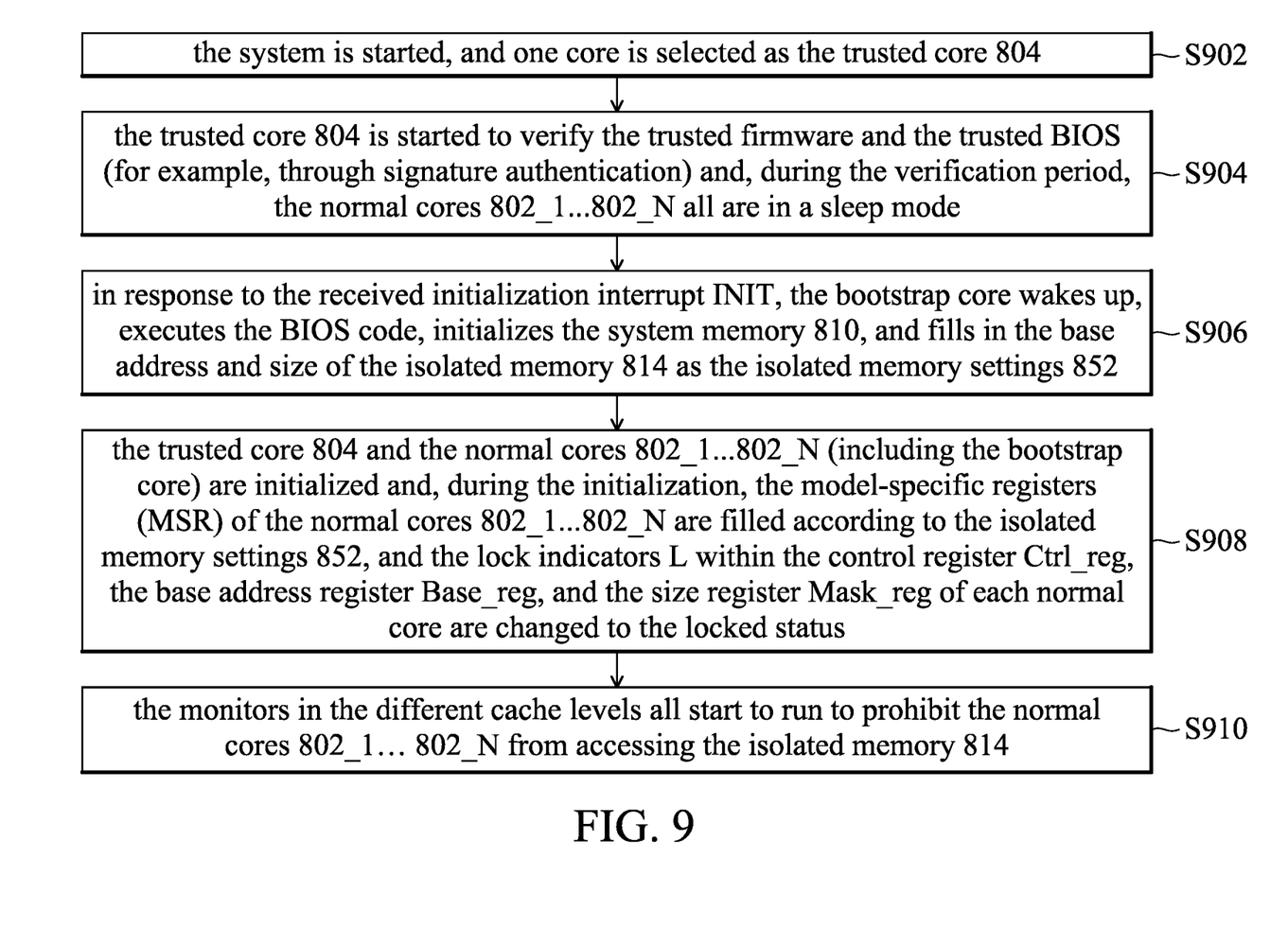
FIG. 9 is a flowchart illustrating a startup procedure of the processor 800 of FIG. 8 in accordance with an exemplary embodiment of the present application.

FIG. 9 is a flowchart illustrating a startup procedure of the processor 800 of FIG. 8 in accordance with an exemplary embodiment of the present application.

In step S902, the system is started, and one core is selected as the trusted core 804. In step S904, the trusted core 804 is started to verify the trusted firmware and the trusted basic input and output system (for example, through signature authentication). During the verification period, the normal cores 802_1 . . . 802_N all are in a sleep mode. When one of the normal cores 802_1 . . . 802_N is used as a bootstrap core to wait for an initialization interrupt INIT, the other normal cores wait for a startup interrupt startupIPI. After the trusted core 804 completes the verification, it sends an initialization interrupt INIT to the bootstrap core, and enters a sleep mode (hlt sleep). The bootstrap core may be named a bootstrap processor (BSP for short), which is one of the normal cores 802_1 . . . 802_N. In step S906, in response to the received initialization interrupt INIT, the bootstrap core wakes up, executes the basic input and output system (BIOS) code, initializes the system memory 810, and fills in the base address and size of the isolated memory 814 as the isolated memory settings 852. Then, the bootstrap core wakes up the other normal cores (e.g., by sending a startup interrupt startupIPI to the other normal cores). In step S908, the trusted core 804 and the normal cores 802_1 . . . 802_N (including the bootstrap core) are initialized. During the initialization, the model-specific registers (MSR) of the normal cores 802_1 . . . 802_N are filled according to the isolated memory settings 852, and the lock indicators L within the control register Ctrl_reg, the base address register Base_reg, and the size register Mask_reg of each normal core are changed to the locked status (referring to the descriptions of FIG. 4). In step S910, the monitors in the different cache levels all start to run to prohibit the normal cores 802_1 . . . 802_N from accessing the isolated memory 814.

Unlike the processing flow described in FIG. 5 applicable to an architecture with only one normal core (referring to FIG. 2), the processing flow described in FIG. 9 is applicable to an architecture with several normal cores (referring to FIG. 8). An architecture with multiple normal cores may also correctly prohibit the illegal access to the isolated memory.

According to the technology of the present application, the access control to the isolated memory may be implemented inside the processor cores, which may improve the efficiency of the access control to the isolated memory.

While the application has been described by way of example and in terms of the preferred embodiments, it should be understood that the application is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A processor, comprising:
a trusted core, with a right to access an isolated memory located on a system memory;
a normal core, prohibited from accessing the isolated memory; and
a last-level cache, shared by the trusted core and the normal core;
wherein:
an in-core cache structure of the normal core and the last-level cache are included in a hierarchical cache system; and
in response to a memory access request issued by the normal core, the hierarchical cache system determines whether the memory access request hits the isolated memory and, if yes, the hierarchical cache system rejects the memory access request.

2. The processor as claimed in claim 1, wherein:
when the memory access request hits the isolated memory, the hierarchical cache system triggers an interrupt; and
when a prefetch address predicted by the hierarchical cache system hits the isolated memory, the hierarchical cache system rejects access at the prefetch address without triggering the interrupt.

3. The processor as claimed in claim 1, wherein:
the normal core uses model-specific registers to record a base address and size of the isolated memory, to be read by the hierarchical cache system as a reference to determine whether the memory access request hits the isolated memory.

4. The processor as claimed in claim 3, wherein:
the normal core enables the interrupt through the model-specific registers; and
the normal core further sets an interrupt type adopted by the enabled interrupt through the model-specific registers.

5. The processor as claimed in claim 3, wherein the normal core plans the model-specific registers to provide:
a control register, indicating whether to enable an isolated memory protection function;
a base address register, recording the base address of the isolated memory; and
a size register, recording the size of the isolated memory;
wherein:
the control register, the base register, and the size register each use at least one bit as a lock indicator; and
once the control register, the base address register, and the size register are edited, their lock indicators are asserted together, to prohibit the future modifications on the control register, the base address register, and the size register.

6. The processor as claimed in claim 5, wherein:
the size register has a first bit operative to indicate whether to enable the interrupt;
the size register uses a second bit and a third bit to indicate the interrupt type adopted by the enabled interrupt; and
when the third bit of the size register is asserted, the enabled interrupt is a newly-defined interrupt, wherein for the processor in an ×86 architecture the newly-defined interrupt is defined by selecting a reserved or optional column from an interrupt vector table used in the ×86 architecture.

7. The processor as claimed in claim 3, wherein:
the isolated memory is formed by divided sections of the system memory, the model-specific registers are planned to provide pairs of registers to store pairs of base address and size to indicate the divided sections of the system memory.

8. The processor as claimed in claim 1, wherein:
the in-core cache structure of the normal core includes a first-level cache;
the first-level cache includes a first-level monitor;
the first-level monitor includes a first-level hit logic;
the first-level hit logic determines whether the memory access request hits the isolated memory, so as to assert a first-level hit flag;
in response to the asserted first-level hit flag, the memory access request is prohibited;
if the first-level hit flag is not asserted for the memory access request, the first-level cache is checked to determine whether requested content of the memory access request has already been cached in the first-level cache;
when the requested content of the memory access request has already been cached in the first-level cache, the memory access request is answered by the cached content; and
when the requested content of the memory access request has not been cached in the first-level cache, the memory access request is further transferred to a lower-level cache.

9. The processor as claimed in claim 8, wherein the first-level hit logic includes:
a first AND gate, receiving an access address of the memory access request and the size of the isolated memory;
a second AND gate, receiving the size of the isolated memory and the base address of the isolated memory;
an XOR gate, receiving an output of the first AND gate and an output of the second AND gate; and
an inverter, receiving an output of the XOR gate, wherein the first-level hit flag is obtained from an output of the inverter.

10. The processor as claimed in claim 8, wherein:
the normal core has model-specific registers;
the normal core enables an interrupt through the model-specific registers;
the normal core further sets an interrupt type adopted by the enabled interrupt through the model-specific registers;
the first-level cache includes a hit processing logic;
an enable or disable state of the interrupt, and the interrupt type adopted by the enabled interrupt are read from the model-specific registers and passed to the hit processing logic for reference; and if the interrupt is enabled, in response to the asserted first-level hit flag, the hit processing logic provides an interrupt report to a re-order buffer of the normal core according to the interrupt type adopted by the enabled interrupt.

11. The processor as claimed in claim 10, wherein:
the first-level cache further includes a first-level prefetch address calculation logic, which generates a first-level prefetch address based on the access address input into the first-level cache;
the first-level prefetch address is also input into the first-level monitor to be checked by the first-level hit logic;
the hit processing logic does not respond to the first-level hit flag asserted by the first-level prefetch address.

12. The processor as claimed in claim 11, wherein the first-level cache is a first-level data cache or a first-level instruction cache of the normal core.

13. The processor as claimed in claim 11, wherein:
the first-level cache is coupled to the last-level cache through a second-level cache;
the second-level cache includes a second-level monitor and a second-level cache comparison logic, and the second-level monitor includes a second-level hit logic for prohibiting any access related to the isolated memory; and
the second-level cache comparison logic determines whether the requested content of the memory access request has already been cached in the second-level cache;
when the requested content of the memory access request has already been cached in the second-level cache, the memory access request is answered by the cached content;
when the requested content of the memory access request has not been cached in the second-level cache, the memory access request is further transferred to the last-level cache.

14. The processor as claimed in claim 13, wherein:
the second-level cache further includes a second-level prefetch address calculation logic, which generates a second-level prefetch address based on the first-level prefetch address;
the second-level prefetch address is input into the second-level monitor to be checked by the second-level hit logic.

15. The processor as claimed in claim 14, wherein:
the last-level cache includes a last-level monitor and a last-level cache comparison logic, and the last-level monitor includes a last-level hit logic for prohibiting any access related to the isolated memory;
the last-level cache comparison logic determines whether the requested content of the memory access request has already been cached in the last-level cache;
when the requested content of the memory access request has already been cached in the last-level cache, the memory access request is answered by the cached content;
when the requested content of the memory access request has not been cached in the last-level cache, the memory access request is further transferred to the system memory; and
a trusted memory access request issued by the trusted core carries one symbol, so that the last-level cache does not check whether the trusted memory access request hits the isolated memory.

16. The processor as claimed in claim 15, wherein:
the last-level cache further includes a last-level prefetch address calculation logic, which generates a last-level prefetch address based on the second-level prefetch address; and
the last-level prefetch address is input into the last-level monitor to be checked by the last-level hit logic.

17. The processor as claimed in claim 1, wherein:
the normal core is isomorphic to the trusted core in structure.

18. A method for protection of an isolated memory accessible only by a trusted core of a processor, comprising:
permitting a trusted core of a processor to access an isolated memory located on a system memory, and prohibiting a normal core of the processor from accessing the isolated memory;
in response to a memory access request issued by the normal core, operating a hierarchical cache system of the processor to determine whether the memory access request hits the isolated memory, wherein the hierarchical cache system includes an in-core cache structure of the normal core and a last-level cache shared by the normal core and the trusted core; and
when the memory access request hits the isolated memory, the hierarchical cache system rejects the memory access request.

19. The method as claimed in claim 18, further comprising:
operating by the normal core to use its model-specific registers to record a base address and size of the isolated memory, to be read by the hierarchical cache system as a reference to determine whether the memory access request hits the isolated memory.

20. The method as claimed in claim 19, further comprising:
selecting the trusted core of the processor when a system using the processor starts up;
operating the trusted core to verify a trusted firmware and a trusted basic input and output system while the normal core is in a sleep mode waiting for an initialization interrupt;
when completing verification, the trusted core outputs the initialization interrupt to the normal core and enters a sleep mode;
the normal core wakes up according to the initialization interrupt, and executes a basic input and output system code to initialize the system memory and fill in registers on a chipset to store the base address and size of the isolated memory;
the normal core initializes itself, reads the base address and size of the isolated memory from the registers of the chipset to fill in the model-specific registers in the normal core, and asserts lock indicators within the model-specific registers for protection; and
operating the hierarchical cache system to determine whether the memory access request hits the isolated memory based on the base address and size of the isolated memory stored in the model-specific registers.

21. The method as claimed in claim 19, wherein:
the processor has more than one normal core, and all normal cores of the processor are isomorphic in structure.

22. The method as claimed in claim 21, further comprising:
selecting the trusted core of the processor when a system using the processor starts up;
operating the trusted core to verify a trusted firmware and a trusted basic input and output system while all normal cores are in a sleep mode waiting for initialization interrupts;
when completing verification, the trusted core outputs an initialization interrupt to a bootstrap core, and enters a sleep mode, wherein the bootstrap core is one of the normal cores;
the bootstrap core wakes up according to the received initialization interrupt, and executes a basic input and output system code to initialize the system memory and fill in registers on a chipset to store the base address and size of the isolated memory;
the bootstrap core wakes up the other normal cores for initialization of the normal cores;
each normal core reads the base address and size of the isolated memory from the registers of the chipset to fill in the model-specific registers in each normal core, and assert lock indicators within the model-specific registers of each normal core for protection; and
operating the hierarchical cache system to determine whether the memory access request hits the isolated memory based on the base address and size of the isolated memory stored in the model-specific registers of the normal cores.

23. The method as claimed in claim 18, wherein:
when the memory access request hits the isolated memory, the hierarchical cache system triggers an interrupt; and
when a prefetch address predicted by the hierarchical cache system hits the isolated memory, the hierarchical cache system rejects access at the prefetch address without triggering the interrupt.

24. The method as claimed in claim 23, wherein:
the interrupt is triggered by a first-level cache of the in-core cache structure of the normal core; and
the first-level cache is a first-level data cache or a first-level instruction cache of the normal core.

* * * * *